(12) United States Patent
Kim et al.

(10) Patent No.: US 9,983,072 B2
(45) Date of Patent: May 29, 2018

(54) STRAIN MEASUREMENT SENSOR CAPABLE OF INDICATING STRAIN WITH COLOR EMISSION AND METHOD OF MANUFACTURING THE SAME

(71) Applicant: Kyungpook National University Industry-Academic Cooperation Foundation, Daegu (KR)

(72) Inventors: Ji Sik Kim, Sangju-si (KR); Kee-Sun Sohn, Seoul (KR); Suman Timilsina, Sangju-si (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days. days.

(21) Appl. No.: 15/417,372

(22) Filed: Jan. 27, 2017

(65) Prior Publication Data

US 2018/0113035 A1   Apr. 26, 2018

(30) Foreign Application Priority Data

Oct. 21, 2016   (KR) .................. 10-2016-0137640

(51) Int. Cl.
| | | |
|---|---|---|
| *G01L 1/22* | (2006.01) | |
| *G01L 1/24* | (2006.01) | |
| *G01L 1/18* | (2006.01) | |
| *G02F 1/01* | (2006.01) | |
| *G02F 1/00* | (2006.01) | |

(52) U.S. Cl.
CPC .............. *G01L 1/24* (2013.01); *G01L 1/18* (2013.01); *G02F 1/0072* (2013.01); *G02F 1/0128* (2013.01)

(58) Field of Classification Search
CPC . G01L 1/24; G01L 1/18; G02F 1/0072; G02F 1/0128
USPC ..................................... 73/862.632
See application file for complete search history.

(56) References Cited

U.S. PATENT DOCUMENTS 5,446,334 A * 8/1995 Gaffney .............. H01L 41/1132
250/338.3
6,155,120 A * 12/2000 Taylor .................. A61B 5/1036
73/862.046

(Continued)

FOREIGN PATENT DOCUMENTS

| KR | 1020050086453 | 8/2005 |
| KR | 1020080100662 | 11/2008 |
| WO | WO 2003/078889 | 9/2003 |

*Primary Examiner* — Max Noori
(74) *Attorney, Agent, or Firm* — Norton Rose Fulbright US LLP

(57) ABSTRACT

A strain sensor with color emission indicating a strain is disclosed. The strain sensor can include a piezoresistive layer having a first portion of a polymer matrix body and conductive fillers dispersed in the first portion of the polymer matrix body, a mechano-luminescent layer having a second portion, which is disposed on the first portion, of the polymer matrix body, green emissive particles, and red emissive particles, the green and red emissive particles being dispersed in the second portion of the polymer matrix body, and a first and second electrodes spaced apart from each other and directly connected to the piezoresistive layer.

14 Claims, 6 Drawing Sheets

(56) References Cited

U.S. PATENT DOCUMENTS

| | | | | |
|---|---|---|---|---|
| 6,165,657 | A * | 12/2000 | Yoon | H01J 9/2276 430/25 |
| 6,281,617 | B1 * | 8/2001 | Qiu | C09K 11/06 310/311 |
| 2006/0170332 | A1 * | 8/2006 | Tamaki | C09K 11/02 313/498 |
| 2014/0113828 | A1 * | 4/2014 | Gilbert | H01L 39/126 505/100 |
| 2015/0242057 | A1 * | 8/2015 | Galela | G06F 3/0428 345/175 |

* cited by examiner

[FIG. 1]
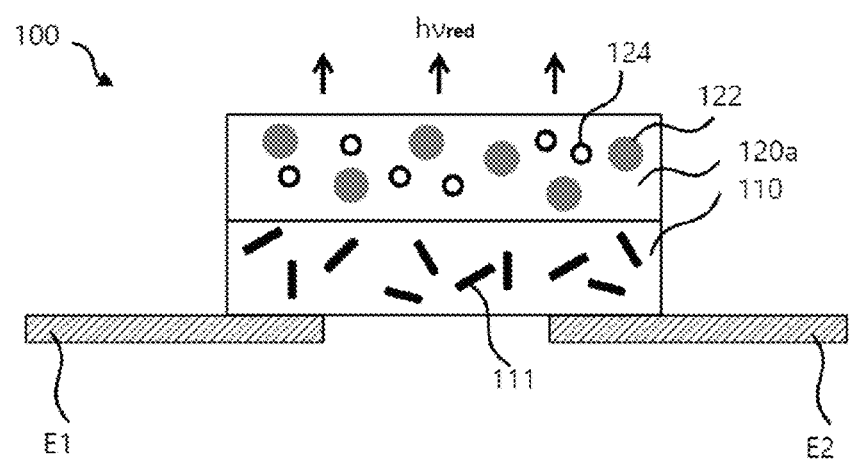
[FIG. 2]
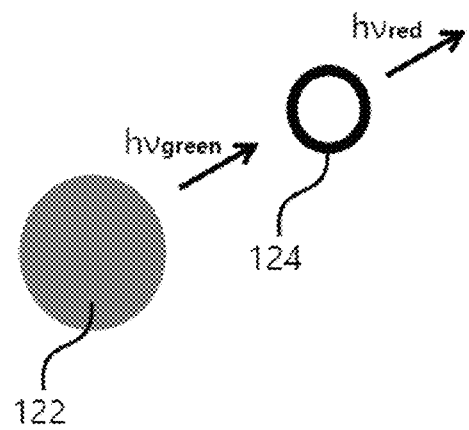

[FIG. 3]
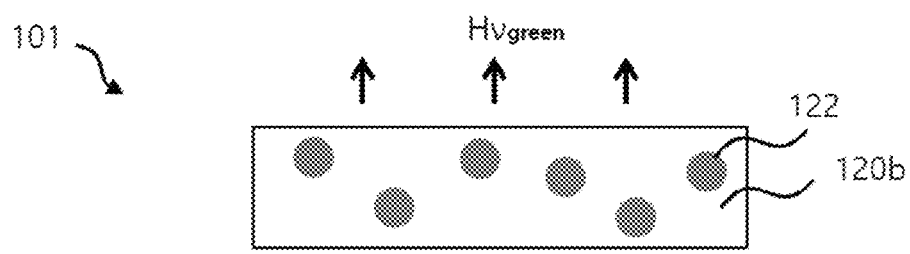
[FIG. 4]
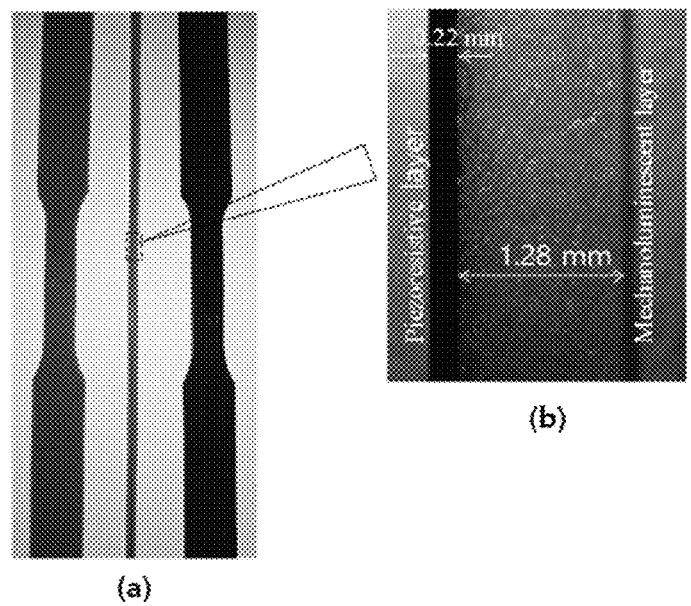

[FIG. 5]
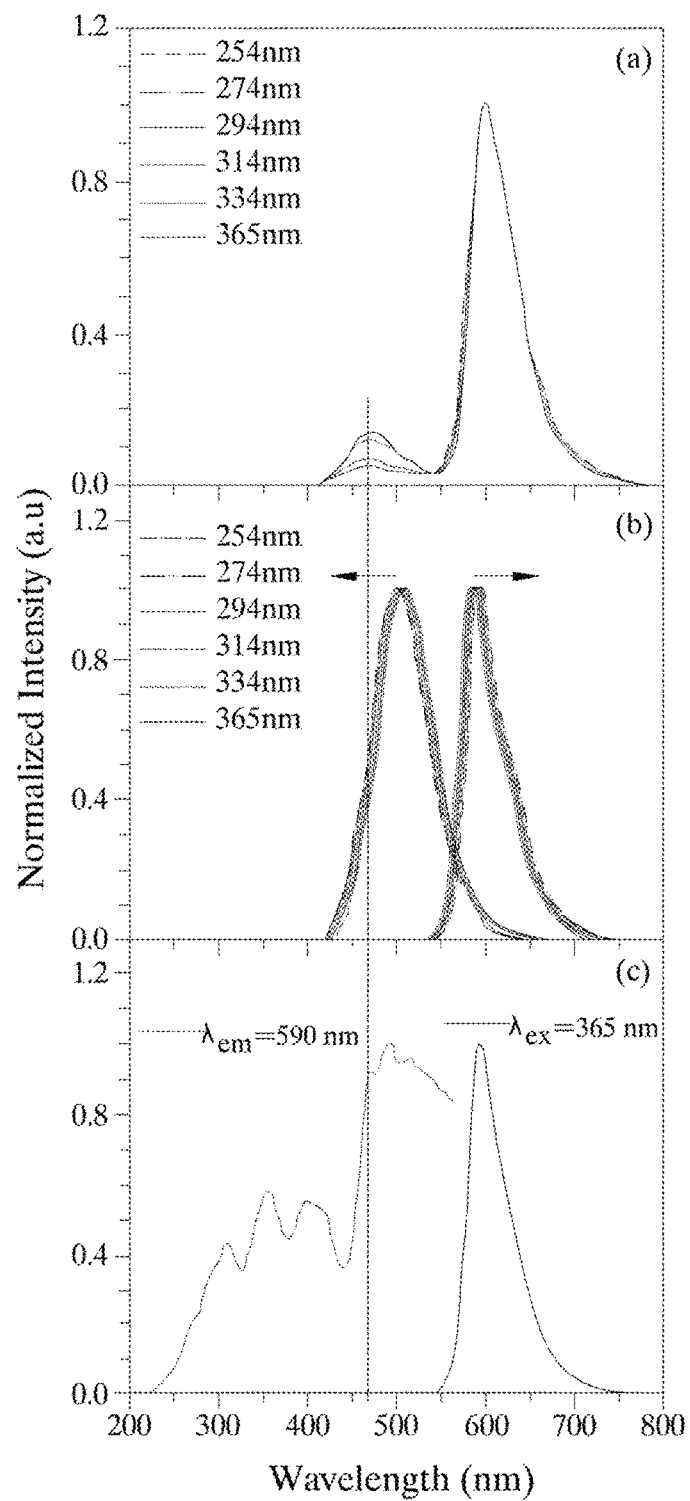

[FIG. 6]
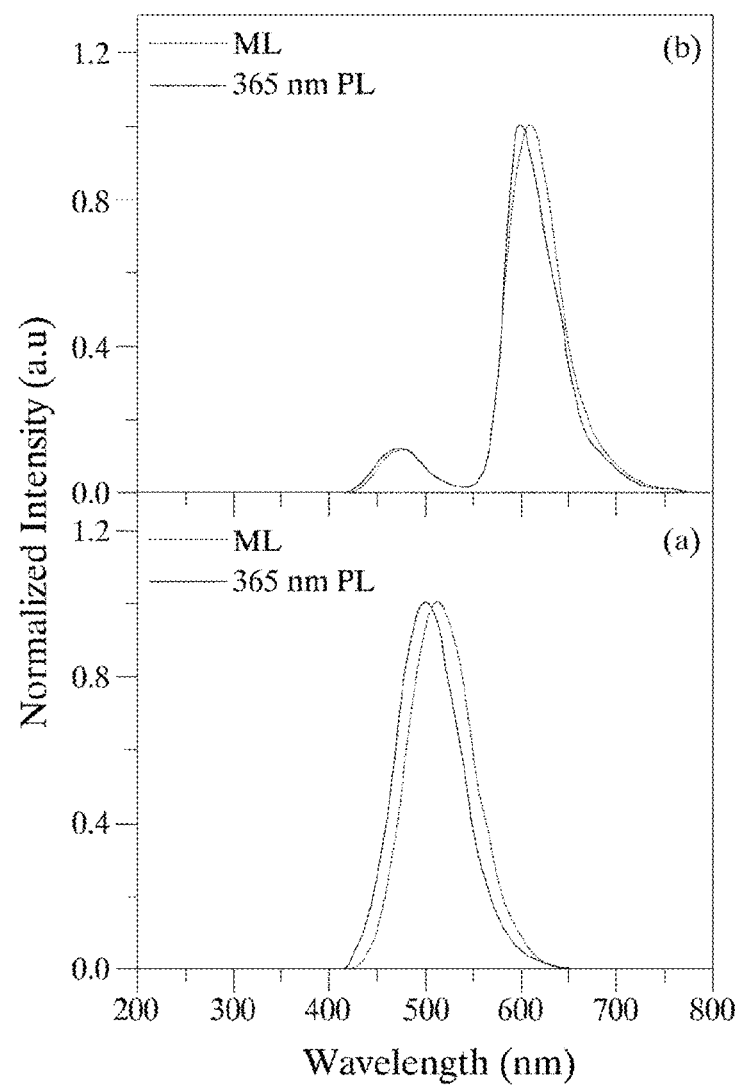

[FIG. 7]
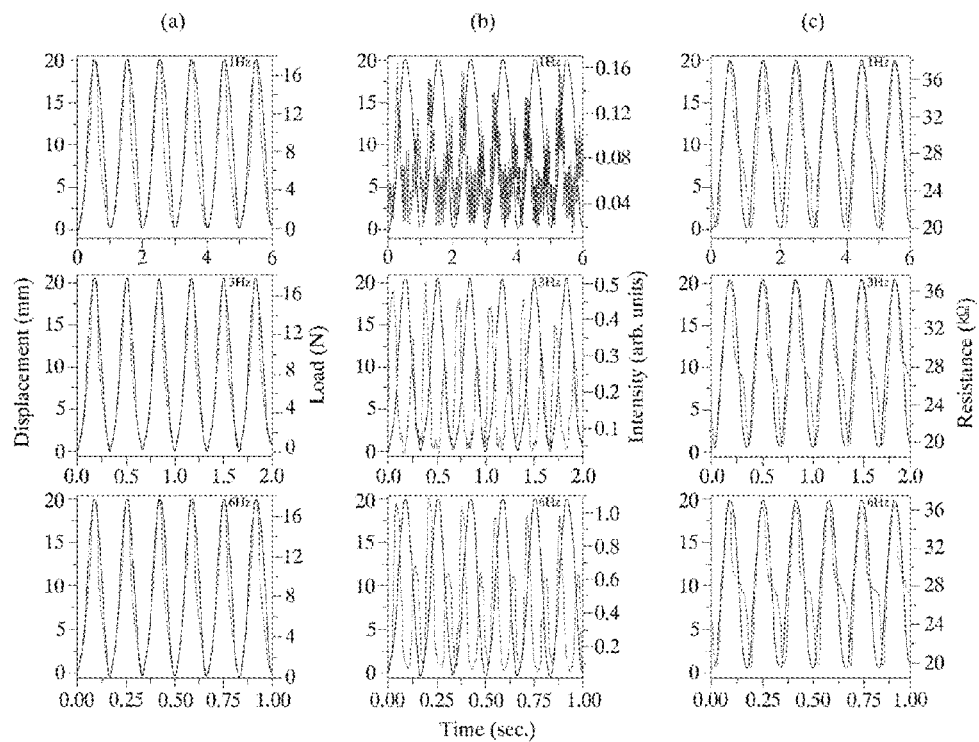
[FIG. 8]
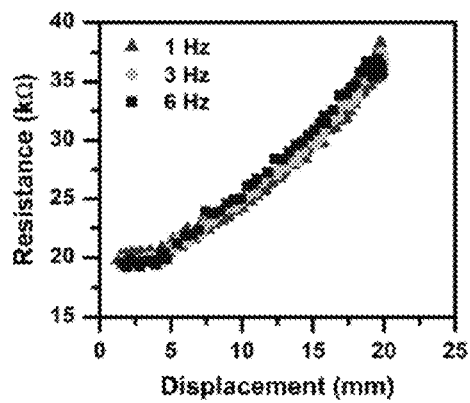

[FIG. 9]
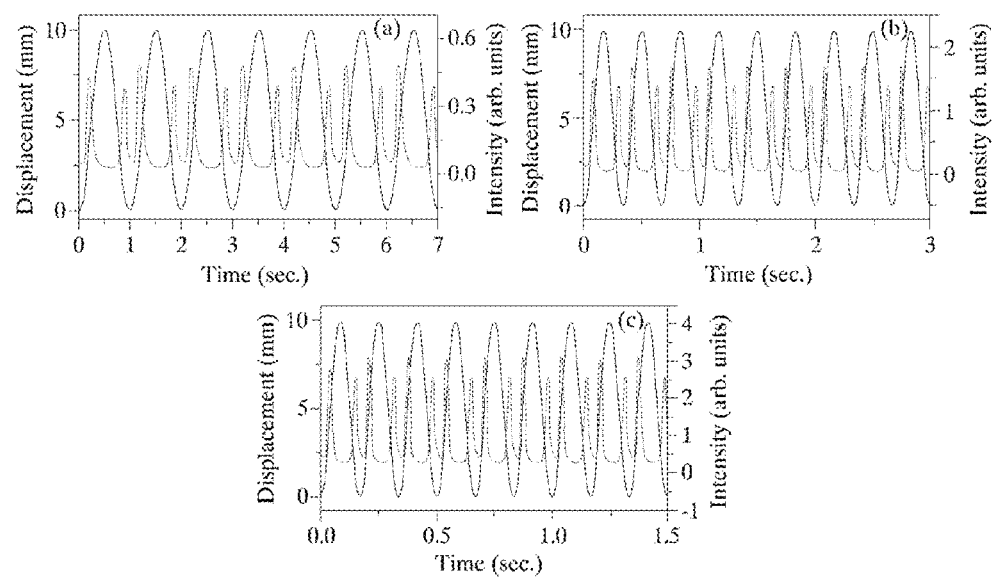

STRAIN MEASUREMENT SENSOR CAPABLE OF INDICATING STRAIN WITH COLOR EMISSION AND METHOD OF MANUFACTURING THE SAME

CROSS-REFERENCE TO RELATED APPLICATION

This application claims the benefit under 35 U.S.C. § 119(a) of Korean Patent Application No. 10-2016-0137640 filed on Oct. 21, 2016, in the Korean Intellectual Property Office, the entire disclosure of which is incorporated herein by reference for all purposes.

BACKGROUND

1. Field

The following description relates to a strain measurement sensor capable of indicating a strain with color emission and a method of manufacturing the same, and, more particularly, to a strain measurement sensor capable of indicating a strain wherein a strain is indicated with a red or green color, and a method of manufacturing the same.

2. Description of Related Art

Various strain or stress sensing systems include laser photoelasticity, laser ultrasonic, Raman spectroscopy, electrical resistance measurement, and strain gauge or wire attachment techniques. However, strain sensors operating through expensive equipment cannot meet requirements for strain sensing in the field. The most effective form for human perception of external stimuli, such as mechanical deformation is an immediate, field-visualized mechano-luminance (ML) form.

There are not so many materials known as a mechano-luminance material having a mechano-luminance property to emit light by mechanical stimulation. Further, the technical field in which the mechano-luminance material is applied is narrow. In order to widely use the mechano-luminance material in various technical fields, it is important to control the intensity or wavelength of light emitted by the mechano-luminance material and improve the lifetime of the mechano-luminance material.

As a non-destructive mechano-luminance, $SrAl_2O_4$ SAO and ZnS-based compound doped with predetermined dopants have been studied. Examples of the SAO-based compound may include $SrAl_2O_4$: Eu, $SrAl_2O_4$:Eu,Dy, $SrAl_2O_4$: Eu,Dy,Nd, etc. Examples of ZnS-based compound may include ZnS:Mn, ZnS:Cu,Al, ZnS:Cu,Mn, ZnS:Cu,Cl, etc. The most promising level of the mechano-luminance may include a green emission from ZnS:Cu, and colors emission varying between blue and yellow from $SrAl_2O_4$:Eu,Dy with variation of dopants.

Red light emission from both SAO and ZnS based compounds using the emission color change through the dopant control has been reported. However, this is true only when conventional trap emission mechano-luminance mechanism responding to a stress is applied for rigid matrix materials such as epoxy resin containing the compounds. In this case, since the trap emission is generated by applied external stress, the compounds are mainly used for the stress sensor. However, it is necessary to excite the active factor thereof with UV before use. Further, only when the compounds are mixed with the rigid matrix material and, thus, the stress transfer is secure, the compounds exhibit a visible light amount in proportion with the stress velocity.

However, recently, it is reported that when ZnS:Cu is mixed with an elastic material having low friction organic electronegativity and large displacement under weak stress such as PDMS, light emission resulting from displacement in a different manner from conventional methods such as friction organic electroluminescence is generated at a high luminance, and thus the mixture is applied to a displacement sensor which responds to a high displacement. Particularly, in the case of using the friction organic electroluminescence, mechanical electroluminescence by the displacement itself is possible without the necessity of activation by UV in advance, and the luminescence brightness is also superior to that in the conventional trap emission mechanism. Therefore, for displacement measurement, it is more advantageous to combine the ZnS:Cu with PDMS to realize the friction organic electroluminescence. However, unlike the conventional trap emission approach, the friction organic electroluminescence approach realizes only the light emission from blue to orange. Thus, there is no finding of a mechano-luminance material with friction organic electroluminescence exhibiting the red emission.

In this connection, when the red emission is employed for safety-related applications for social facility safety, emergency guide lighting, etc., or important biomedical applications for interlocking disorder or activity diagnosis of internal organs such as stomach or intestine, etc., the visualization effect will be better than blue or yellow emission, and, thus, the benefit of the visual warning effect can be maximized.

Although the friction organic electroluminescent material exhibiting yellow emission such as ZnS based compounds has been developed, it is impossible to realize exact red color emission by such a material. Among the inorganic phosphor group including the SAO based compounds, there is no mechano-luminance ML material as a single promising red phosphor showing emission efficiency as high as that in the ZnS based compound. In addition, there is a limit in that it is difficult to find a light conversion material capable of converting green emission to red emission among the entire inorganic phosphor group.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a strain measuring sensor to indicate a strain with a color emission wherein the emission intensity is proportion to a strain rate.

Further, the present disclosure is to provide a method for manufacturing a strain measuring sensor.

In one aspect, there is provided a strain sensor with color emission indicating a strain, the strain sensor comprising; a piezoresistive layer configured to have varying electrical resistance according to a displacement due to external force or pressure applied thereto; and a mechano-luminescent layer disposed on the piezoresistive layer, wherein the mechano-luminescent layer includes: green emissive particles with green emission due to the external force or pressure applied thereto; and red emissive particles configured to absorb the green emission from the green emissive particles, to convert the absorbed green emission to red emission, and to emit the red emission, wherein the mechano-luminescent layer emits the red emission using the force or pressure applied thereto.

In one implementation, each of the red emissive particles include an inorganic core and a fluorescent material coated on the surface of the inorganic core, wherein the fluorescent material emits the red emission.

In one implementation, the inorganic core includes silica, and wherein the fluorescent material includes rhodamine B.

In one implementation, the green emissive particles include zinc sulfide doped with copper (ZnS:Cu).

In one implementation, the mechano-luminescent layer includes a polymer matrix in which the green emissive particles are dispersed, wherein when the mechano-luminescent layer has a displacement due to the force or pressure applied thereto, a triboelectric field is generated by the displacement, and the triboelectric field enables the green emissive particles to emit the green emission.

In one implementation, the triboelectric field is proportional to a change rate of the displacement of the mechano-luminescent layer.

In one implementation, the piezoresistive layer includes: a polymer matrix made of a polymer compound; and conductive fillers disposed in the polymer matrix.

In one implementation, each of the conductive fillers is carbon-based.

In one implementation, a weight ratio between the green emissive particles and red emissive particles in the mechano-luminescent layer is at least 1:1.2, and an amount of the red emissive particles is larger than an amount of the green emissive particles.

In one implementation, each of the mechano-luminescent layer and the piezoresistive layer includes a polymer matrix made of a polymer compound, wherein the polymer compound includes polydimethyl siloxane (PDMS).

In another aspect, there is provided a method for manufacturing a strain sensor with color emission indicating a strain, the method comprising: forming a partially cured piezoresistive matrix layer using a piezoresistive material including a liquid polymer compound and conductive fillers, the conductive fillers being dispersed in the partially cured piezoresistive matrix layer; disposing a mechano-luminance material on the partially cured piezoresistive matrix layer, the mechano-luminance material including non-cured polymer compound, green emissive particles and red emissive particles, wherein the green emissive particles emit green emission due to external force or pressure applied thereto, and the red emissive particles absorb the green emission from the green emissive particles, converts the absorbed green emission to red emission, and emits the red emission; and curing the mechano-luminance material and the partially cured piezoresistive matrix layer together concurrently, thereby to form a stack of a mechano-luminescent layer and a piezoresistive layer.

In one implementation, each of the red emissive particles includes an inorganic core and a fluorescent material coated on the surface of the inorganic core, wherein the inorganic core is made of silica, wherein the fluorescent material includes rhodamine B.

In still another aspect, there is provided a strain sensor with color emission indicating a strain, the sensor comprising: a mechano-luminescent layer including a polymer matrix and green emissive particles dispersed in the polymer matrix, wherein the green emissive particles emit green emission using a triboelectric field resulting from a displacement due to external force or pressure applied to the mechano-luminescent layer.

In one implementation, the triboelectric field is generated by a friction between the green emissive particles and the polymer matrix.

In one implementation, the sensor further comprises a piezoresistive layer on the mechano-luminescent layer, wherein the piezoresistive layer is configured to have varying electrical resistance according to a displacement due to external force or pressure applied thereto.

In one implementation, the triboelectric field is proportional to a change rate of a displacement of the mechano-luminescent layer.

In one implementation, each of the green emissive particles includes both of a sphalerite phase and a wurtzite phase.

In accordance with the first sensor of the present disclosure, an intensity and location of the strain may be quantified using the intensity of the red emission from the mechano-luminescent layer and the resistance variation from the piezoresistive layer. The strain sensor with the red emission may be successfully employed for safety-related applications for social facility safety, emergency guide lighting, etc., or important biomedical applications for interlocking disorder or activity diagnosis of internal organs such as stomach or intestine, etc., In accordance with the method of the present disclosure, the piezoresistive layer and mechano-luminescent layer have the same polymer matrix to function to receive the external force and transfer the force to the functional particle or fillers therein. Further, the mechano-luminescent solution is applied on the partially cured piezoresistive layer, and then, the mechano-luminescent solution and the partially cured piezoresistive layer are completely cured at the same time. Thus, this may lead to an increase in a bonding force between the piezoresistive layer and mechano-luminescent layer.

Further, In accordance with the second sensor of the present disclosure, in the mechano-luminescent layer, the green emissive particles emit green emission using a triboelectric field resulting from friction between the particles and the polymer matrix due to external force or pressure applied to the layer. Further, the triboelectric field is proportional to a change rate of a displacement of the mechano-luminescent layer. Thus, this sensor may have a variety of technical applications.

Other features and aspects may be apparent from the following detailed description, the drawings, and the claims.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1 is a side elevation view of a strain measuring sensor to indicate a strain with a color emission in accordance with one embodiment of the present disclosure.

FIG. 2 illustrates red emission in a mechano-luminescent layer in FIG. 1.

FIG. 3 is a side elevation view of a strain measuring sensor to indicate a strain with a color emission in accordance with another embodiment of the present disclosure.

FIG. 4 shows images of a strain measuring sensor of an example 1 having a configuration as in FIG. 1.

FIG. 5 shows graphs illustrating emission characteristics for a mechano-luminescent layer of an example 1, for a mechano-luminescent layer of an example 2, and for a red emission layer of a comparison example.

FIG. 6 shows graphs illustrating fluorescence characteristics and mechano-luminance characteristics for mechano-luminescent layers of examples 1 and 2 respectively.

FIG. 7 shows graphs illustrating mechanical characteristics, mechano-luminance characteristics and piezoresistive characteristics for a sensor layer of an example 1.

FIG. 8 shows a graph illustrating piezoresistive characteristics for a sensor layer of an example 1.

FIG. 9 shows graphs illustrating mechanical characteristics, mechano-luminescence characteristics and piezoresistive characteristics for a sensor layer of an example 2.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

FIG. 1 is a side elevation view of a strain measuring sensor to indicate a strain with a color emission in accordance with one embodiment of the present disclosure. FIG. 2 illustrates red emission in a mechano-luminescent layer in FIG. 1.

Referring to FIG. 1 and FIG. 2, a strain measuring sensor 100 may measure e a strain and indicate the strain as a color. A sensor layer may include a piezoresistive layer 110 and a mechano-luminescent layer 120a.

The piezoresistive layer 110 may have varying electrical resistance depending on displacements due to external forces or pressures. The piezoresistive layer 110 may include a polymer matrix and a conductive filler 111 in the polymer matrix.

The polymer matrix is made of a polymer material capable of transferring stress to the conductive filler 111. The polymer matrix may be any polymer compound having flexibility and elasticity without particular limitation. In this connection, it is desirable to use a compound having a low Young's modulus. The polymer matrix of the piezoresistive layer 110 may be made of substantially the same material as the material forming the polymer matrix of the mechano-luminescent layer 120a. In this connection, in order to facilitate the electroluminescence in the mechano-luminescent layer 120a when there are frictions between the polymer matrix and green emissive particles 122 in the mechano-luminescent layer 120, a low induced electronegativity is necessary. Thus, the polymer matrix of the piezoresistive layer 110 and the polymer matrix of the mechano-luminescent layer 120a all may be made of a compound having a low triboelectric electronegativity. The triboelectric electronegativity refers to the electro negativity of the electricity induced by the friction. A material with the high triboelectric electronegativity has the ability to attract the electrons well while a material with the low triboelectric electronegativity gives away electrons. Examples of the polymer compound having the low Young's modulus and low triboelectric electronegativity as the polymer matrix of the piezoresistive layer 110 may include Teflon, latex rubber, polydimethylsiloxane (PDMS), and the like.

The conductive filler 111 may be a metal material, a carbon material, etc. Examples of the metal material include metals such as nickel (Ni), copper (Cu), silver (Ag), aluminum (Al), iron (Fe), etc., or metal oxides such as vanadium oxides, or titanium oxides having the semiconductor properties. Examples of the carbon material include carbon black, graphite, graphene, carbon nanotubes, and the like.

In this connection, 0.75 to 2.5 parts by weight of the conductive filler 111 may be contained over 100 parts by weight of the polymer matrix in the piezoresistive layer 110. When the content of the conductive filler 111 is less than 0.75 parts by weight, the piezoresistive characteristics of the piezoresistive layer 110 are negligibly small. When the content of the conductive filler is more than 2.5 parts by weight, the conductance is saturated.

Further, when forming the polymer matrix of the piezoresistive layer 110, the content of a curing agent for the polymer compound may be 0.1 to 20 parts by weight based on 100 parts by weight of the polymer compound included in the polymer matrix. When the content of the curing agent is more than 0.1 part by weight, the polymeric compound in the liquid state can be solidified by curing. When the content of the curing agent exceeds 20 parts by weight, the cured polymeric compound may be brittle.

The mechano-luminescent layer 120a is formed in contact with the piezoresistive layer 110, and emits red light $hv_{red}$ out of the mechano-luminescent layer 120a due to external force or pressure. Mechano-luminescent layer 120a may include the polymer matrix, green emissive particles 122 and red emissive particles 124 disposed therein.

The polymer matrix of the mechano-luminescent layer 120a may be made of substantially the same material as the material forming the polymer matrix of the piezoresistive layer 110. In this connection, in order to facilitate the electroluminescence in the mechano-luminescent layer 120a when there are frictions between the polymer matrix and green emissive particles 122 in the mechano-luminescent layer 120, a low induced electronegativity is necessary. Thus, the polymer matrix of the mechano-luminescent layer 120a may be made of a compound having a low triboelectric electronegativity (Refer to http://www.trifield.com/content/triboelectric-series/). Examples of the polymer matrix of the mechano-luminescent layer 120a may include Teflon, latex rubber, polydimethylsiloxane (PDMS), and the like.

The green emissive particles 122 may emit green light by external pressure or force. In particular, external pressure or force causes displacement in the mechano-luminescent layer 120a such that a friction induced electric field is generated. This electric field enables the green emissive particles 122 to emit green light. The electric field is formed by the friction between the polymer matrix and the green emissive particles 122. The electroluminescence due to the friction induced electric field may be green electroluminescence $hv_{green}$. The green emissive particles 122 may be any material that exhibits electroluminescence without any particular limitation. In one example, the green emissive particles 122 may be an electroluminescence-type fluorescence particles, examples of which may be made of zinc sulfide (ZnS) doped with copper (Cu), that is, ZnS: Cu.

When the green emissive particles 122 are made of ZnS: Cu, the green emissive particles 122 may contain both of a sphalerite phase and a wurtzite phase. When the green emissive particles 122 contains only the wurtzite phase, the electroluminescence may not be realized. Thus, it is preferable that the green emissive particles 122 may contain both of a sphalerite phase and a wurtzite phase when the green emissive particles 122 are made of ZnS: Cu.

The red emissive particles 124 may absorb the green light $hv_{green}$ emitted from the green emissive particles 122 and convert the green light $hv_{green}$ to red light $hv_{red}$. Thus, the red emissive particles 124 may be any material that exhibits the above-defined function without any particular limitation.

In one embodiment, the red emissive particles 124 may be embodied as fine particles, each having a coated light conversion layer thereon to absorb the green light $hv_{green}$ emitted from the green emissive particles 122 and convert the green light $hv_{green}$ to the red light $hv_{red}$ and to emit the red light $hv_{red}$. In this connection, the light conversion layer may be made of rhodamine B. The light conversion layer may be coated on the surface of each of the fine particles, for example, silica particles. The rhodamine B may be a colorant compound and may convert the green emission to the red emission efficiently. In this connection, when the rhodamine B is directly dispersed in the polymer matrix, a dispersion in the polymer matrix may be poor. Thus, the rhodamine B may be coated on the surface of each of the fine particles, for example, silica particles, thereby to form the red emissive particles 124, which, in turn, are dispersed in the polymer matrix in the mechano-luminescent layer 120a. In this way, the mechano-luminescent layer 120a may be completed.

In the mechano-luminescent layer 120a, a content ratio between the green emissive particles 122 and red emissive particles 124 may be above 1:1.2 inclusive. That is, the content of the red emissive particles 124 should be at least 1.2 times larger than the content of the green emissive particles 122. When the content of the red emissive particles 124 is less than 1.2 times the content of the green emissive particles 122, the entire green emission $hv_{green}$ emitted from the green emissive particles 122 could not be converted to the red emission $hv_{red}$. Thus, the emission from the strain measuring sensor 100 may have a mixture of red and green emissions, thereby to deteriorate the red color reproduction. In this way, the strain measuring sensor 100 may emit t color of orange, reddish, and the like. Therefore, there is a problem that the strain measuring sensor 100 cannot indicate a strain in a pure red color.

As the red emissive particles 124 of the mechano-luminescent layer 120a emit the red emission $hv_{red}$, ultimately the strain measuring sensor 100 will emit the red emission $hv_{red}$ due to external pressure or force.

The strain measuring sensor 100 may include a first electrode E1 and a second electrode E2, wherein the both electrodes are connected to the piezoresistive layer 110. The piezoresistive layer 110 changes the electrical resistance due to external pressure or force, and the change can be measured and quantified through the first and second electrodes E1 and E2.

Referring to FIG. 1, a method for manufacturing a strain measuring sensor 100 will be described. A first solution containing an uncured, liquid polymeric compound and a conductive filler 111 as a material for manufacturing the piezoresistive layer 110 is prepared. Then, a curing agent to cure the liquid polymer compound to change the liquid into a solid phase is added to the first solution. Then, a heat treatment is performed for a predetermined time. The heat treatment is preferably terminated before the liquid polymer is completely cured. Specifically, the heat treatment is preferably terminated when the liquid polymer is partially cured such that there is formed a partially cured matrix layer in which the conductive filler 111 is dispersed.

Next, a second solution containing a liquid polymeric compound and green emissive particles 122 and red emissive particles 124 is prepared as a material for manufacturing the mechano-luminescent layer 120a. Then, a curing agent is mixed thereto. Then, the second solution is coated on the partially cured piezoresistive layer 110. The second solution and the partially cured piezoresistive layer 110 are heat-treated. In this connection, the heat treatment time is preferably sufficient to completely cure the partially cured polymer matrix of the piezoresistive layer 110 and to completely cure the polymeric compound constituting the mechano-luminescent layer 120a. Since the second solution is cured with the partially cured matrix layer at the same time such that the polymer matrix of the piezoresistive layer 110 and the polymer matrix of the mechano-luminescent layer 120a are formed together at the same time, it is possible to minimize the surface tension between the piezoresistive layer 110 and the mechano-luminescent layer 120a, thereby maximizing the bonding force between the layers.

As mentioned above, the strain measuring sensor 100 according to the present disclosure has an advantage that the resistance change based on the strain can be measured through the piezoresistive layer 110 and the strain can be indicated with a color emission through the mechano-luminescent layer 120a. In particular, the mechano-luminescent layer 120a may emit the red emission with high color purity, thus effectively transmitting dramatic warning information by the visual method through the red emission.

FIG. 3 is a side elevation view of a strain measuring sensor to indicate a strain with a color emission in accordance with another embodiment of the present disclosure.

Referring to FIG. 3, a strain measuring sensor 101 to indicate a strain with a color emission in accordance with another embodiment of the present disclosure may include a mechano-luminescent layer 120b. The mechano-luminescent layer 120b may include the green emissive particles 122 and polymer matrix.

The green emissive particles 122 and the polymer matrix of the mechano-luminescent layer 120b are substantially identical with those as shown in FIG. 1 and FIG. 2. Thus, detailed descriptions thereof will be omitted. The strain measuring sensor 101 as shown in FIG. 3 does not contain the red emissive particles 124 unlike the strain measuring sensor 101 of FIG. 1 and FIG. 2. Thus, only the green emissive particles 122 emit green emission finally due to external force or pressure. In this connection, the green emissive particles 122 emit green emission by the triboelectric field induced by friction between the green emissive particles 122 and the polymer matrix. Using these characteristics, the strain can be expressed as the green emission.

Although not shown in the figure, the mechano-luminescent layer 120b as shown in FIG. 3 may be combined with the piezoresistive layer 110 as shown in FIG. 1. When the mechano-luminescent layer 120b as shown in FIG. 3 is combined with the piezoresistive layer 110 as shown in FIG. 1, the green emission may be emitted by the strain measuring sensor.

In addition, a light conversion layer (not shown) may be disposed on the mechano-luminescent layer 120ba as shown in FIG. 3 and may receive the green emission from the mechano-luminescent layer 120b. The light conversion layer absorbs the green emission emitted by the mechano-luminescent layer 120b, converts the green emission into the red emission, and emits the red emission to the outside. In this connection, the light conversion layer may have a structure in which rhodamine B-coated silica particles as described above with reference to FIG. 1 and FIG. 2 are dispersed in the polymer matrix. In addition, the piezoresistive layer 110 described in FIG. 1 may be disposed on a stack of the mechano-luminescent layer 120b and light conversion layer to form a strain measuring sensor emitting the red emission.

Hereinafter, specific examples and characteristics evaluation of a sensor layer will be described in more detail.

Example 1

A strain measuring sensor in this example has been manufactured as follows:

ZnS:Cu (available from LONCO Company Limited), rhodamine B (available from Sigma-Aldrich), silica (SiO2, available from Sigma-Aldrich), carbon nanotube (CNT, available from carbon nano material Technology Co. Ltd) and PDMS (poly dimethyl siloxane, Sylgard® 184 Silicone Elastomer) are prepared. In this connection, the radius of the silica was 20 nm, and the multi-wall CNT with a radius of 20 nm and a length of 5 μm was used.

(1) Preparation for Material for Mechano-Luminescent Layer

First, in order to coat the silica surface with rhodamine B, 0.1 g of rhodamine B and 10 g of silica were mixed with 200 mL of methanol and then continuously stirred at 50° C. using a magnetic stirrer. Then, the methanol was completely evaporated, such that the silica coated with the rhodamine B (silica@rhodamine B) as red powders was obtained.

Then, the silica@rhodamine B and ZnS:Cu were homogeneously mixed at a weight ratio of 1.25:1 to prepare a homogeneous mixture. Next, the homogeneous mixture and liquid phase PDMS were mixed in another plastic cylinder at a weight ratio of 5:1. A Pt-based catalyst was added as a PDMS curing agent thereto. The PDMS curing agent and PDMS were mixed with each other at a weight ratio of 1:10, and then stirred in a mixer for 20 minutes.

(2) Preparation for Material of Piezoresistive Layer

One percent by weight of CNT was mixed with liquid PDMS in a plastic cylinder, and, then a PDMS curing agent was added thereto. In this connection, the weight ratio between the PDMS curing agent and PDMS was 1:10.

(3) Preparation for Sensor Layer

On a glass substrate, a rectangular mold having a size of 15 mm×5 mm was disposed using a paper tape having a thickness of 0.3 mm. Using Doctor's Blade technique, the CNT/PDMS for the piezoresistive layer fabrication was poured into the mold to have 0.22 mm thickness. Then, the glass substrate was heated at 60° C. for 30 minutes in a casted state. Thus, the CNT/PDMS was partially solidified. The silica@rhodamine B and ZnS: Cu/PDMS were poured on the solidified CNT/PDMS in the mold to have 1.28 mm according to Doctor's Blade technique. Then, the glass substrate was heated at 60° C. for 2 hours, and, thus, a fully solidified double layer was produced as a sensor layer.

The gauge length, width and thickness of the fabricated sensor layer sample were 25 mm×6 mm×1.5 mm. In this connection, the thickness of the piezoresistive layer in the sensor layer was 0.22 mm, and the thickness of the mechano-luminescent layer was 1.28 mm (see FIG. 4, FIG. 4(a) indicates the sample and FIG. 4(b) indicates an enlarged image of a portion in the sample).

(4) Preparation for Strain Measuring Sensor

Two copper wires were connected to the piezoresistive layer of the sensor layer, to produce the strain measuring sensor.

Example 2

The example 2 was different from the example 1 in that, for producing the mechano-luminescent layer, only ZnS:Cu was employed.

Characteristics Evaluation-1: Optical Characteristics

Six wavelengths in the range of 254 nm to 365 nm were applied to each of the mechano-luminescent layer made according to the example 1, the mechano-luminescent layer made according to the example 2 and the red emission layer for comparison respectively. Then, emission intensities emitted from the mechano-luminescent layer made according to the example 1, the mechano-luminescent layer made according to the example 2 and the red emission layer for comparison were measured respectively. The results are shown in FIG. 5.

In FIG. 5. FIG. 5($a$) indicates a photoluminescence (PL) spectrum of the mechano-luminescent layer according to the example 1, and FIG. 5($b$) indicates emission spectrums of the mechano-luminescent layer according to the example 2 and the red emission layer for comparison. In FIG. 5($a$) and FIG. 5($b$), the above six wavelengths in the range of 254 nm to 365 nm were 254 nm, 274 nm, 294 nm, 314 nm, 334 nm and 365 nm. FIG. 5 ($c$) indicates a mechano-luminance spectrum and a photoluminescence excitation spectrum appearing at 590 nm of the red emission layer of the comparative example.

Referring to FIG. 5($a$), when both red emissive particles and green emissive particles are used, an emission peak having a very high intensity in a wavelength range of 500 nm to 600 nm appears. Further, a further emission peak appears in a wavelength range of 400 nm to 500 nm but has a weak low intensity.

Referring FIG. 5($b$), for a left spectrum, a strong emission peak appears in the wavelength range of 450 nm to 550 nm, while for a right spectrum, a strong emission peak appears in the wavelength range of 500 nm to 600 nm. The latter may correspond to the case when only red emissive particles are used. The spectrum of ZnS:Cu shifts to the blue wavelength as the application wavelengths proceeds from 254 nm to 274 nm to294 nm to 314 nm to 334 nm to 365 nm. The spectrum of silica@rhodamine B shifts to the red wavelength as the wavelengths proceeds from 254 nm to 274 nm to 294 nm to 314 nm to 334 nm to 365 nm.

In comparison between FIG. 5($b$) and FIG. 5($a$), referring to the spectrum of (b), the green emission emitted by ZnS:Cu in the mechano-luminescent layer according to the example 1 is substantially converted into the red emission due to the silica@rhodamine B. Referring to FIG. 5 ($c$), the PLE spectrum measured at 590 nm for the silica@rhodamine B explains that the emission spectrum shape of ZnS:Cu in the mechano-luminescent layer according to the example 1 as shown in FIG. 5 ($a$) changes.

That is, it is shown that the excitation of silica@rhodamine B is drastically decreased in a left portion of the spectrum of ZnS:Cu luminescence as shown in FIG. 5($b$) (nearby 450 to 500 nm), while only a right portion of the spectrum of ZnS:Cu luminescence shifts to the blue wavelength due to the absorption of silica@rhodamine B.

Thus, it can be seen that the green emission generated by ZnS:Cu as the photoluminescence characteristics in the mechano-luminescent layer according to example 1 is substantially absorbed by silica@rhodamine B which in turn, emits the red emission.

Characteristics Evaluation-2: Mechano-Luminance Characteristics

In order to evaluate the mechano-luminance characteristics, the optical excitation characteristics using very ultraviolet (wavelength: 365 nm) irradiation to tensile specimens were measured, and 20 mm repeated tensile tests by displacement control were performed for the tensile specimens. The normalized intensity (unit: a.u) for each wavelength (unit: nm) was obtained, and the result was shown in FIG. 4.

FIG. 6 shows graphs illustrating fluorescence characteristics and mechano-luminance characteristics for mechano-luminescent layers of the examples 1 and 2 respectively.

Referring to FIG. 6, FIG. 6($a$) illustrates fluorescence characteristics and mechano-luminance characteristics for the mechano-luminescent layer of the example 2. FIG. 6($b$) illustrates fluorescence characteristics and mechano-luminance characteristics for the mechano-luminescent layer of the example 1. A black graph labeled "365 nm PL" indicates changes due to the ultraviolet irradiation. The gray graph labeled "ML" indicates changes due to the displacement control.

In FIG. 6($a$), referring to the black graph, when the ultraviolet ray is irradiated to ZnS:Cu contained in the mechano-luminescent layer, green emission particles absorbs the ultraviolet light to emit green emission (a peak at 450 nm to 500 nm). Referring to the gray graph, it may be confirmed that ZnS:Cu emits green emission using the triboelectric field caused by the displacement and thus the friction with PDMS.

In FIG. 6($b$), referring to the black graph, since ZnS:Cu contained in the mechano-luminescent layer is a fluorescence material, the green emission material absorbs the ultraviolet light to emit green emission when the ultraviolet light is irradiated thereto (a peak at 450 nm to 500 nm), but, a peak with a low intensity at a wavelength of about 600 nm (that is, the red emission) appears due to insufficient absorption. In other words, it can be visually confirmed that the green emission emitted by the green fluorescence material is absorbed by silica@rhodamine B which in turn, converts the same into the red emission.

Referring to the gray graph in FIG. 6 ($b$), it can be seen that the trend is substantially the same as that of the black graph. That is, when 20 mm displacement is applied, green emission is emitted from the green emissive particles and then the green emission is absorbed by silica@rhodamine B which in turn, converts the same into the red emission.

According to the present disclosure, the mechano-luminescent layer included in the sensor layer of the present disclosure exhibits mechano-luminance characteristics which is substantially the same as the optical excitation characteristics, wherein the green emission is generated by external pressure and then the green emission is converted to the red emission.

Characteristics Evaluation-3: Mechanical Characteristics, Mechano-Luminance Characteristics and Piezoresistive Characteristics The change of the stress for the strain measuring sensor including the mechano-luminescent layer according to the example 1 as prepared above was measured when displacements of the sine waveforms at 1 Hz, 3 Hz and 6 Hz by displacement control between 0 and 20 mm are applied thereto. The results are shown in FIG. 7(a).

Under the same condition as the mechanical test condition, the emission characteristics of the mechano-luminescent layer were measured using PMT (Photo Multiplier Tube). The results are shown in FIG. 7 (b).

Also, the applicants measured the resistance change due to the displacement of the piezoresistive layer. The results are shown in FIG. 7(c) and FIG. 8.

FIG. 7 shows graphs illustrating mechanical characteristics, mechano-luminance characteristics and piezoresistive characteristics for a sensor layer of the example 1. FIG. 8 shows a graph illustrating piezoresistive characteristics for a sensor layer of the example 1.

Referring to FIG. 7(a), it can be seen from the graph that the correlation of stress and strain is linear in all frequency ranges. That is, it may be confirmed from the data that the strain measuring sensor according to the present disclosure is very suitable for application as a stress or displacement sensor in terms of mechanical characteristics.

Referring to FIG. 7 (b), it can be seen that the mechano-luminance is generated in the process of increasing or decreasing the strain, and, further, the mechano-luminance is generated in proportion to the strain. However, it is observed that the emission amounts are different between the strain rate increase and decrease. When the strain rate increases, the emission amount increases.

In view of the above findings, a sensor having only a mechano-luminescent layer is not suitable as a strain measuring sensor because the strain cannot be quantitatively measured by a mechano-luminescent layer alone. However, in accordance with the present disclosure, the mechano-luminescent layer and piezoresistive layer are advantageously used in combination with each other to use both the luminance characteristics and the piezoresistive characteristics.

Referring to FIG. 7(c) and FIG. 8, it can be seen that a correlation between changes in displacement and resistance is substantially linear in almost the entire frequency range. Therefore, it can be concluded that the piezoresistive layer of the sensor layer according to the present disclosure has a perfect role as a quantitative displacement sensor, and that it is very appropriate to use the resistance change for the quantification of the displacement.

Characteristics Evaluation-4: Mechanical Characteristics, Mechano-Luminance Characteristics and Piezoresistive Characteristics The change of the stress for the strain measuring sensor including the mechano-luminescent layer according to the example 2 as prepared above was measured when displacements of the sine waveforms at 1 Hz, 3 Hz and 6 Hz by displacement control between 0 and 20 mm are applied thereto. The results are shown in FIG. 9.

FIG. 9 shows graphs illustrating mechanical characteristics, mechano-luminance characteristics and piezoresistive characteristics for a sensor layer of the example 2.

FIG. 9(a), FIG. 9(b), and FIG. 9(c) indicate stress changes when the displacement is 1 Hz, 3 Hz, and 6 Hz, respectively.

Referring to FIG. 9, since loading-displacement curves when loading is not adjusted, and the displacement is merely adjusted substantially overlaps with the same pattern irrespective of Hz, it is not critical whether an input applied to the sensor layer is the loading or displacement input. Even when the applied displacement has the form of a perfect single sinusoidal wave, the emitted light emission is composed of dual distinct peaks for each loading cycle. A similar dual peaks response is shown for the ZnS: Mn film with 500 N applied thereto, wherein the dual peaks are formed by the controlled electrostatic loading and the sudden release at a relatively long time. It may be typical mechano-luminance dependent on loading rate, which appears different from dynamic cycle behavior. This mechano-luminance is merely due to the triboelectric field sufficient to generate a luminescence. That is, this refers to a luminescence of ZnS:Cu resulting from the triboelectric field caused by the friction between ZnS:Cu and PDMS. The dual peaks in the mechano-luminescent layer including ZnS:Cu and PDMS are due to separation and retreat at an interface therebetween. In this connection, it may be confirmed that the emission resulting from the triboelectric field is proportional with the displacement change rate.

That is, from the results of FIG. 9, the green light emission from the mechano-luminescent layer including ZnS:Cu and PDMS is not mechano-luminance caused by the simple loading and displacement difference but the mechano-luminance resulting from the triboelectric field induced by the friction between them.

In this connection, the strain sensor with the red emission may be successfully employed for safety-related applications for social facility safety, emergency guide lighting, etc., or important biomedical applications for interlocking disorder or activity diagnosis of internal organs such as stomach or intestine, etc., Further, the strain measuring sensor including the mechano-luminescent layer with the green emission may be widely employed in various technical fields.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

While the disclosure has been shown and described with reference to certain exemplary embodiments thereof, it will be understood by those skilled in the art that various changes in form and details may be made therein without departing from the scope of the disclosure as defined by the appended claims.

What is claimed is:

1. A strain sensor with color emission indicating a strain, the strain sensor comprising:
   a piezoresistive layer comprising a first portion of a polymer matrix body and conductive fillers dispersed in the first portion of the polymer matrix body, the piezoresistive layer being configured to have varying electrical resistance according to a displacement of the polymer matrix body due to external force or pressure applied thereto;
   a mechano-luminescent layer, comprising a second portion, which is disposed directly on the first portion, of the polymer matrix body, green emissive particles, and red emissive particles, the green and red emissive particles being dispersed in the second portion of the polymer matrix body; and first and second electrodes spaced apart from each other and directly connected to the piezoresistive layer, the first and second electrodes being configured to measure changes of electrical resistance of the piezoresistive layer according to the displacement of the polymer matrix body, wherein each of the green emissive particles emits green emission due to the displacement of the polymer matrix, each of the red emissive particles comprises an inorganic core and a fluorescent layer coated on the surface of the inorganic core, and the fluorescent layer absorbs the green emission from the green emissive particles and emits red emission, wherein the mechano-luminescent layer emits the red emission using the force or pressure applied thereto.

2. The sensor of claim 1, wherein the inorganic core includes silica, and wherein the fluorescent material includes rhodamine B.

3. The sensor of claim 1, wherein the green emissive particles comprise a zinc sulfide doped with copper (ZnS:Cu) particle having both of a sphalerite phase and a wurtzite phase.

4. The sensor of claim 1, wherein a triboelectric field is generated by the displacement of the mechano-luminescent layer, and the triboelectric field enables the green emissive particles to emit the green emission.

5. The sensor of claim 4, wherein the triboelectric field is proportional to a change rate of the displacement of the mechano-luminescent layer.

6. The sensor of claim 1, wherein each of the conductive fillers is carbon-based.

7. The sensor of claim 1, wherein a weight ratio between the green emissive particles and red emissive particles in the mechano-luminescent layer is at least 1:1.2, and an amount of the red emissive particles is larger than an amount of the green emissive particles.

8. The sensor of claim 1, wherein the polymer matrix body is made of polydimethyl siloxane (PDMS).

9. A method for manufacturing a strain sensor with color emission indicating a strain, the method comprising:

forming a partially cured piezoresistive matrix layer using a piezoresistive material including a first polymer compound and conductive fillers, the conductive fillers being dispersed in the partially cured piezoresistive matrix layer;

disposing a mechano-luminance material directly on the partially cured piezoresistive matrix layer, the mechano-luminance material including non-cured polymer compound, which is the same as the first polymer compound, green emissive particles, and red emissive particles, wherein the green emissive particles emit green emission due to external force or pressure applied thereto, and the red emissive particles absorb the green emission from the green emissive particles, converts the absorbed green emission to red emission, and emits the red emission; and curing the mechano-luminance material and the partially cured piezoresistive matrix layer together concurrently, thereby to form a body of a mechano-luminescent layer and a piezoresistive layer.

10. The method of claim 9, wherein each of the red emissive particles includes an inorganic core and a fluorescent material coated on the surface of the inorganic core, wherein the inorganic core is made of silica, wherein the fluorescent material includes rhodamine B.

11. A strain sensor with color emission indicating a strain, the sensor comprising:

a piezoresistive layer comprising a first portion of a polymer matrix body and conductive fillers dispersed in the first portion of the polymer matrix body, the piezoresistive layer configured to have varying electrical resistance according to a displacement of the polymer matrix body due to external force or pressure applied thereto;

a mechano-luminescent layer comprising a second portion, which is disposed directly on the first portion, of the polymer matrix body and green emissive particles dispersed in the second portion of the polymer matrix body, the green emissive particles emitting green emission due to the displacement of the polymer matrix;

a light conversion layer disposed on the mechano-luminescent layer and configured to absorb the green emission to emit red emission; and first and second electrodes spaced apart from each other and directly connected to the piezoresistive layer, the first and second electrodes being configured to measure changes of electrical resistance of the piezoresistive layer according to the displacement of the polymer mixture.

12. The sensor of claim 11, wherein the triboelectric field is generated by a friction between the green emissive particles and the polymer matrix.

13. The sensor of claim 11, wherein the triboelectric field is proportional to a change rate of a displacement of the mechano-luminescent layer.

14. The sensor of claim 11, wherein each of the green emissive particles includes both of a sphalerite phase and a wurtzite phase.

* * * * *